(12) United States Patent
Taurand

(10) Patent No.: US 6,285,568 B1
(45) Date of Patent: Sep. 4, 2001

(54) PROCESS FOR CONTROLLING A DC/DC CONVERTER WITH INDUCTIVE STORAGE AND INCLUDING AN ENERGETICALLY NEUTRAL PHASE

(75) Inventor: Christophe Taurand, Valence (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/581,230

(22) PCT Filed: Dec. 23, 1998

(86) PCT No.: PCT/FR98/02854

§ 371 Date: Jun. 23, 2000

§ 102(e) Date: Jun. 23, 2000

(87) PCT Pub. No.: WO99/34501

PCT Pub. Date: Jul. 8, 1999

(30) Foreign Application Priority Data

Dec. 23, 1997 (FR) .................................................. 97 16348

(51) Int. Cl.[7] .................................................. H02M 3/335
(52) U.S. Cl. .......................................................... 363/21.14
(58) Field of Search ................................. 363/20, 21, 97, 363/131

(56) References Cited

U.S. PATENT DOCUMENTS

| | | | |
|---|---|---|---|
| 4,870,555 | * 9/1989 | White | 363/21 |
| 5,594,629 | * 1/1997 | Steigerwald | 363/131 |
| 5,745,351 | * 4/1998 | Taurand | 363/20 |
| 5,774,345 | * 6/1998 | Yoshida et al. | 363/98 |
| 5,805,434 | * 9/1998 | Vinciarelli et al. | 363/21 |
| 5,847,941 | * 12/1998 | Taguchi et al. | 363/21 |
| 5,999,420 | * 12/1999 | Aonuma et al. | 363/21 |
| 6,038,147 | * 3/2000 | Jacobs et al. | 363/131 |
| 6,069,804 | * 5/2000 | Ingman et al. | 363/131 |
| 6,084,784 | * 7/2000 | Durbaum | 363/97 |
| 6,101,104 | * 8/2000 | Eng | 363/21 |

FOREIGN PATENT DOCUMENTS

| | | | |
|---|---|---|---|
| 4438387 | * 5/1996 | (DE) | H02M/3/28 |
| 767529 | * 4/1997 | (EP) | H02M/3/337 |
| 2729516 | * 7/1996 | (FR) | H02M/3/335 |

* cited by examiner

Primary Examiner—Jeffrey Sterrett
(74) Attorney, Agent, or Firm—Oblon, Spivak, McClelland, Maier & Neustadt, P.C.

(57) ABSTRACT

A process for controlling a DC/DC voltage converter and a DC/DC voltage converter with inductive storage, operating according to cycles for transferring energy between a primary source and a secondary source. Each cycle includes a period of accumulation of magnetic energy in an inductive element from the primary source, followed by a period of restitution of this energy in the secondary source, wherein an energetically neutral phase of a duration such that the DC/DC voltage converter operates at a predetermined frequency is introduced into the operating cycles.

16 Claims, 4 Drawing Sheets

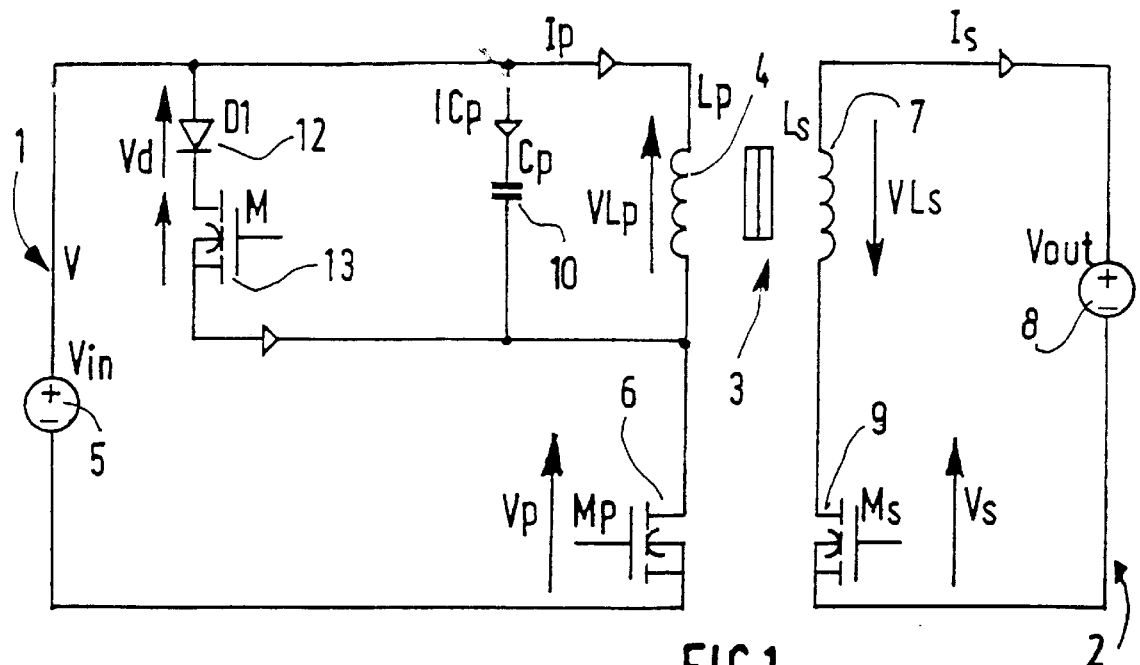
FIG.1
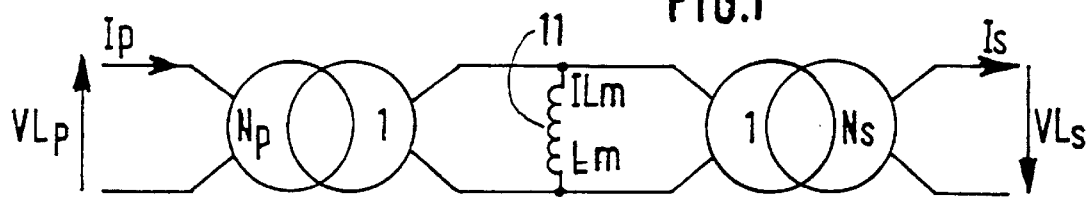
FIG.1a
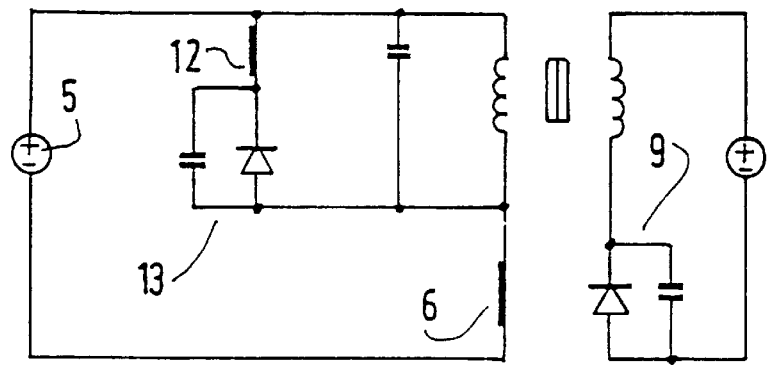
FIG.2.1
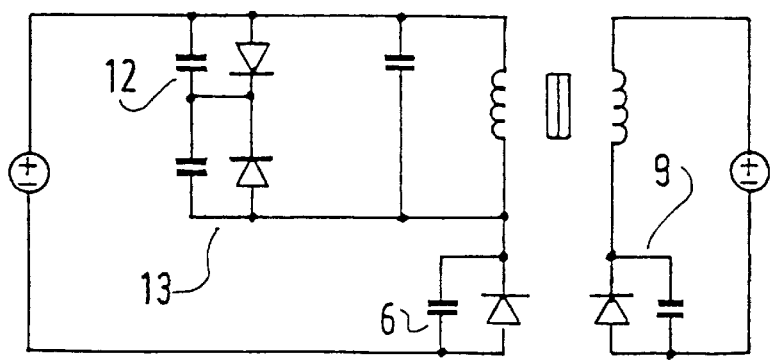
FIG.2.2

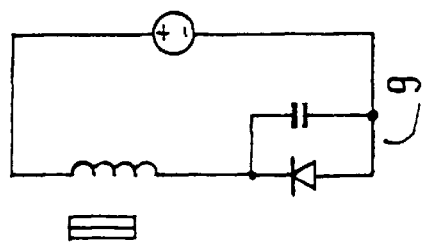
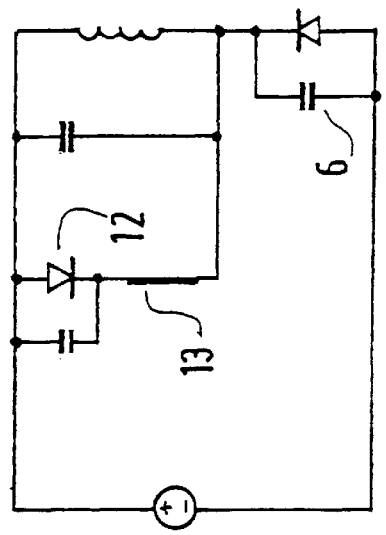
FIG.2_4
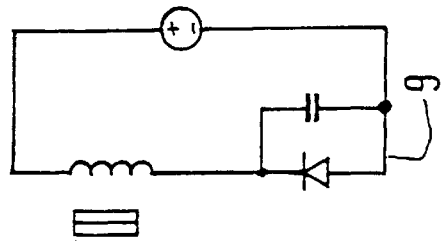
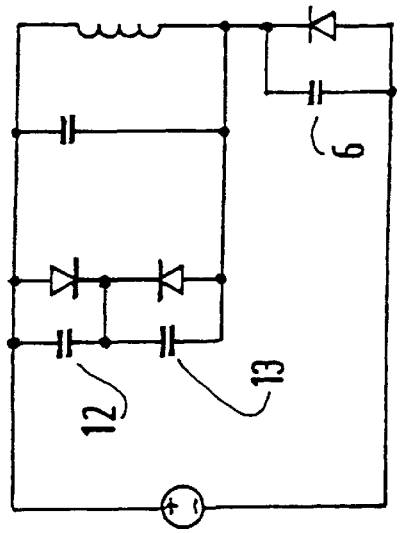
FIG.2_6
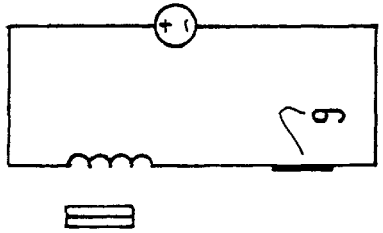
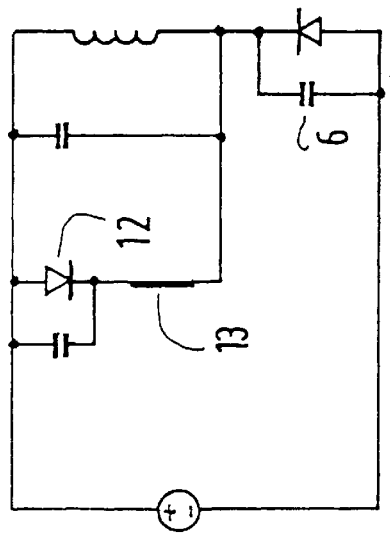
FIG.2_3
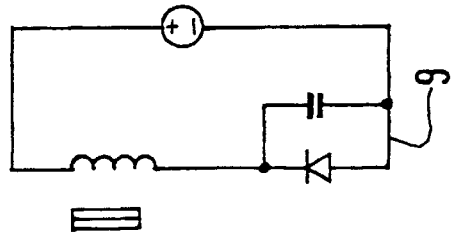
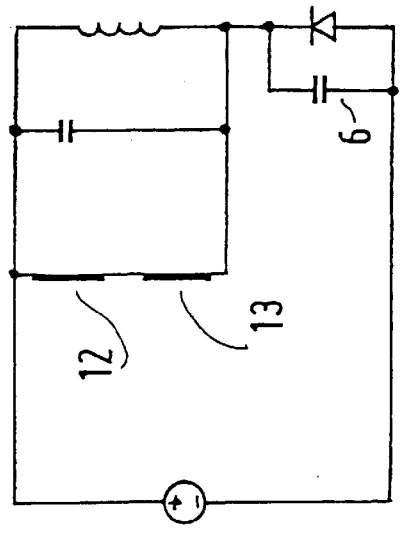
FIG.2_5

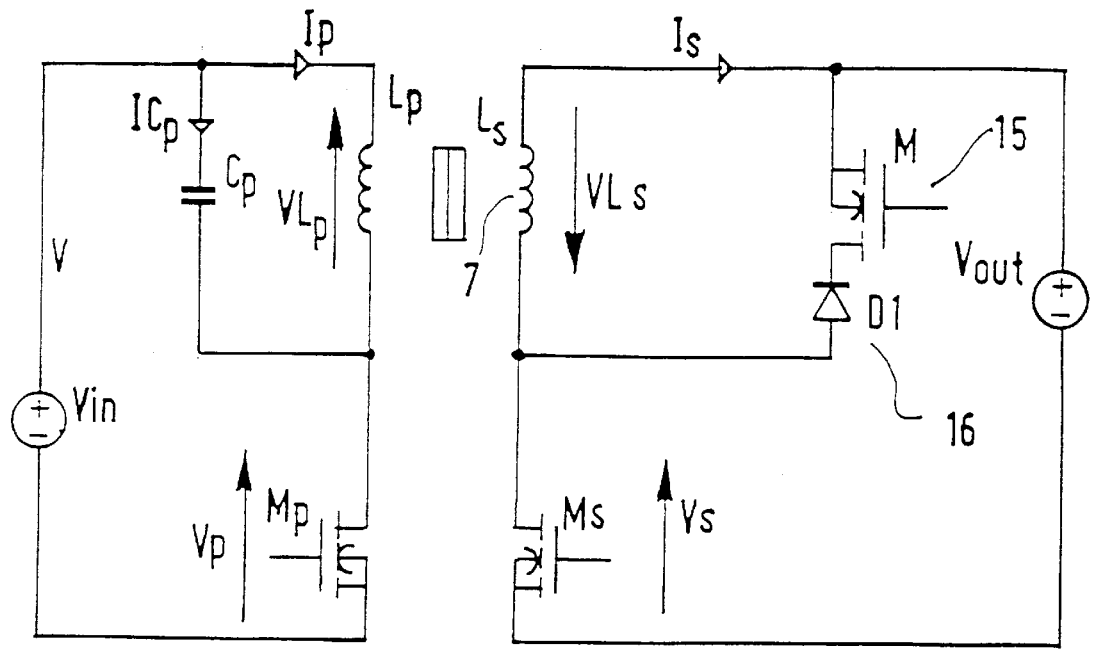
FIG.5
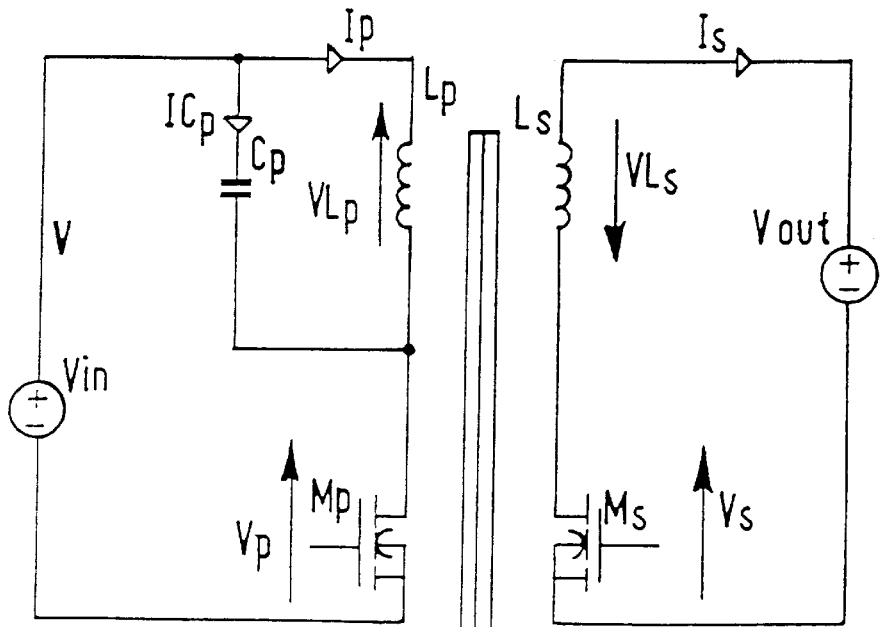
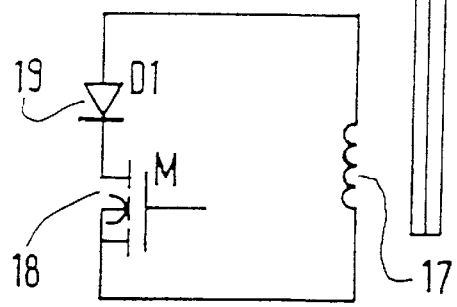
FIG.6

PROCESS FOR CONTROLLING A DC/DC CONVERTER WITH INDUCTIVE STORAGE AND INCLUDING AN ENERGETICALLY NEUTRAL PHASE

BACKGROUND OF INVENTION

1. Field of the Invention

The present invention relates to a process for controlling a DC/DC voltage converter, or chopper, with inductive storage. More particularly, the invention relates to such a process which, in a known manner, operates according to cycles for transferring energy between a primary source and a secondary source, each cycle comprising a period of accumulation of magnetic energy in an inductive element from the primary source, followed by a period of restitution of this energy in the secondary source.

2. Discussion of the Background

DC/DC voltage converters with inductive storage comprise an inductive storage element placed between a primary circuit with a controlled switch interposed ahead of a power supply source and a secondary circuit with switch interposed ahead of a load. The primary circuit ensures, through the tripping of its switch, the control of the cycles for delivering energy from the power supply source to the inductive storage element whilst the secondary circuit ensures the control of the cycles for delivering energy from the inductive storage element to the load.

Originally, these DC/DC voltage converters used a fixed chopping frequency and possessed no regulation of their output voltage. The fixed chopping frequency was a beneficial characteristic when powering loads sensitive to radioelectric noise since the radioelectric noise of the converter remained confined within a small band around its chopping frequency and it was possible, by shifting this chopping frequency, to succeed in minimizing the influence of the radioelectric noise of the converter on its load by taking account of the latter's sensitive frequencies. On the other hand, the absence of output voltage regulation was very often a hindrance in so far as it was subject to sizeable fluctuations as a function of the variations in the power absorbed by the load and of the variations in voltage of the power supply source.

At first, provision was made, at the output of DC/DC voltage converters with inductive storage, for ballast-based voltage regulation in respect of loads sensitive to supply voltage variations. However, this resulted in a sizeable loss of efficiency. To solve this problem, DC/DC voltage converters with inductive storage were subsequently equipped with servocontrols for regulating their output voltage which essentially alter the duration of their cycle of energy delivery to their inductive storage element.

There are a large number of types of servocontrols for regulating output voltage for DC/DC converters with inductive storage. Among the most successful may be cited that described in French Patent Application FR-A-2 729 516. These output voltage regulating servocontrols are generally satisfactory and improve efficiency to a great extent. However, they cause a variation in the chopping frequency as a function of the power absorbed by the load and of the voltage of the power supply source. This variation in chopping frequency produces a broadening of the noise band of the converter, rendering the problems with radioelectric spurious interference of the loads more difficult to solve. Furthermore, it induces variations in the efficiency which decreases as the chopping frequency increases.

DC/DC voltage converters with inductive storage and output voltage servocontrol are well known, from the prior art, especially from German Patent DE-44 38 387, these converters operating at fixed frequency but posing problems both of efficiency and of radioelectric noise since they engender large current pulses.

These converters comprise, as is customary, an inductive storage element, a primary circuit with controlled switch interposed between a power supply source and the inductive storage element and a secondary circuit with switch interposed between the inductive storage element and a load. Moreover, in their primary circuit, they exhibit an overcurrent detector which causes the controlled switch to open in the event of an overcurrent, and in their secondary circuit they exhibit a device for short-circuiting the terminals of the inductive storage element triggered as a function of the instantaneous voltage appearing across the terminals of the load. Regulation of the voltage across the terminals of the load is obtained here by displacing the transition between the periods of accumulation and of restitution of energy from the inductive storage element in the course of each chopping cycle of constant duration. To do this, a short circuit is created, in the secondary circuit, earlier or later in each period of accumulation of energy in the inductive storage element, that is to say while the controlled switch of the primary circuit is conducting, this short circuit causing an overcurrent in the primary circuit and tripping the opening of the controlled switch by the overcurrent detector. This overcurrent pulse at each chopping cycle degrades the efficiency and increases the radioelectric noise of the converter.

SUMMARY OF THE INVENTION

The present invention is aimed in particular at alleviating these drawbacks and, more especially at providing a DC/DC voltage converter with inductive storage, and output voltage regulation, having, as compared with those of the prior art, a lower level of radioelectric noise, in a narrower frequency band, and better efficiency over a greater operating span, both as regards the voltage and the power absorbed by the load.

For this purpose, the subject of the invention is firstly a process for controlling a DC/DC voltage converter with inductive storage operating according to cycles for transferring energy between a primary source and a secondary source, each cycle comprising: two separate phases, a phase of accumulation of magnetic energy in an inductive storage element from the primary source and a phase of restitution of this energy in the secondary source and comprising in order to do this, apart from the said inductive storage element, a primary circuit with controlled switch interposed between the primary source and the inductive storage element, and a secondary circuit with controlled switch interposed between the inductive storage element and the secondary source. In this control process, an energetically neutral phase during which the inductive storage element retains its energy, the controlled switches of the primary and secondary circuits being open and means ensuring a zero electric voltage across the terminals of the inductive storage element, is introduced within a cycle for transferring energy, this energetically neutral phase having a duration within an energy transfer cycle such that the converter operates at a predetermined frequency.

This control process makes it possible to fix as is understood the width of the span of variation of the chopping frequency of the converter, whilst allowing the implementation of the improvements described in document FR-A-2 729 516. The advantages related to these improvements are thus retained together with, furthermore, a new improvement in the efficiency obtained by lowering the magnetic losses and switching losses, the frequency being maintainable at a lower level, without increasing the currents.

In particular, a constant operating frequency will generally be adopted, corresponding to that of the aforementioned document for the minimum input voltage and maximum load conditions which achieve the best efficiency.

Another advantage of operating at constant frequency is that it is possible to synchronize the converter with other functions. It is thus possible to reduce spurious interference, noise or frequency beating.

It is also possible, with a constant operating frequency, to construct input filters tuned to this frequency.

Preferably, the said energetically neutral phase is started at a 0 crossing of the voltage across the terminals of the magnetizing inductance of the inductive element.

Likewise preferably, the said energetically neutral phase is started while the current passing through the magnetizing inductance is as small as possible.

If this phase must start during a 0 crossing of the voltage, one in fact has the choice during the cycle between two instants. One will therefore choose the one where the current is a minimum so as to minimize the current flowing through the element ensuring a zero voltage across the terminals of the inductive element.

In one particular embodiment, the said inductive element is short-circuited with the aid of an MOS transistor arranged in series with a diode, the closing of the transistor being commanded at an instant at which the diode is reverse-biased.

The subject of the invention is also a DC/DC voltage converter with inductive storage, comprising an inductive storage element, a primary circuit with controlled switch interposed between a primary source for providing energy and the said inductive storage element, and a secondary circuit with controlled switch interposed between the inductive storage element and a secondary source for energy restitution and means for cyclically closing the controlled switches of the said primary and secondary circuits during separate time intervals so as to endow the converter with cyclic operation, with, in the course of each cycle, an energy accumulation phase and an energy restitution phase, characterized in that it comprises short-circuiting means for short-circuiting the said inductive storage element, and means for controlling the said short-circuiting means in such a way as to introduce into the operating cycle of the converter an energetically neutral phase, during which the inductive storage element retains a constant energy, the controlled switches of the primary and secondary circuits being open.

In a particular embodiment, the said inductive coupling element comprises a primary winding belonging to the said primary circuit, the said short-circuiting means comprising a controlled switch arranged in parallel with the said primary winding.

In another particular embodiment, the said inductive coupling element comprises a secondary winding belonging to the said secondary circuit, the said short-circuiting means comprising a controlled switch arranged in parallel with the said secondary winding.

In yet another particular embodiment, the said inductive coupling element comprises an auxiliary winding independent of the primary and secondary circuits, the said short-circuiting means comprising a controlled switch arranged in parallel with the said auxiliary winding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an electronic diagram of a converter according to a first embodiment of the invention;

FIG. 1a is a modelling of the transformer represented in FIG. 1;

FIGS. 2-1 to 2-6 illustrate the six phases of the operating cycle of the converter of FIG. 1;

FIG. 3 represents the manner in which the current in the magnetizing inductance and the voltage across the terminals of the primary of the transformer change within the course of this cycle;

FIG. 4 is an energy diagram representing the manner in which the voltage across the terminals of the magnetizing inductance and the current passing through it change in the course of the cycle; and FIGS. 5 and 6 are diagrams similar to that of FIG. 1 of two other embodiments.

DESCRIPTION OF THE PREFERRED EMBODIMENTS

Figure 4:
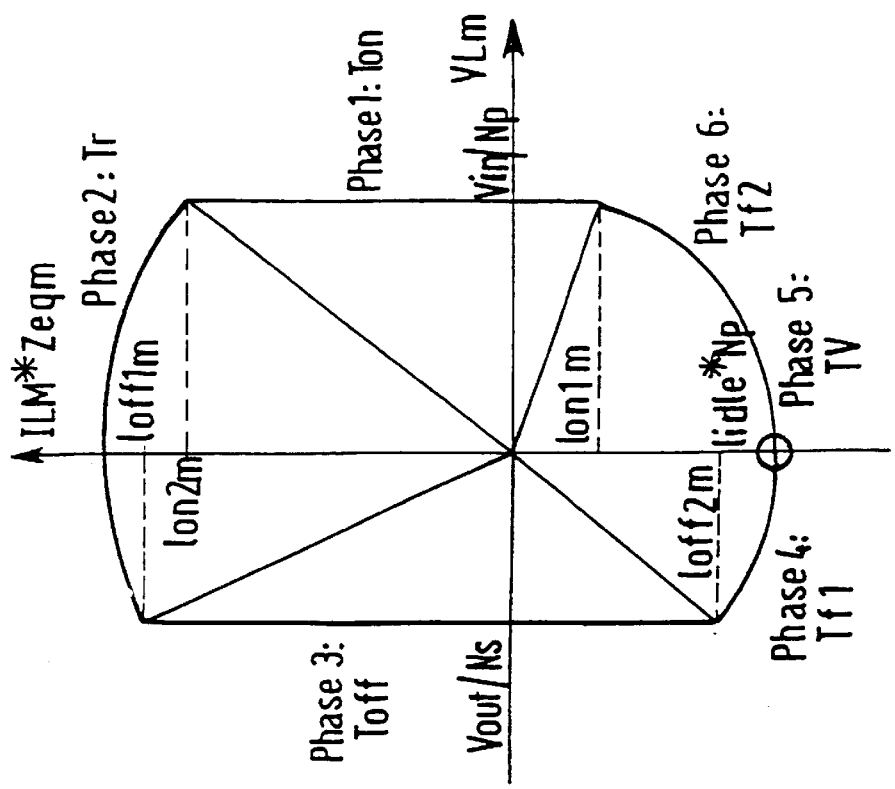

Referring now to the drawings, wherein like reference numerals designate identical or corresponding parts throughout the several views, and more particularly to FIGS. 1–6 thereof, there are illustrated exemplary embodiments of the present invention, as will now be described.

FIG. 1 depicts a DC/DC voltage converter comprising, in a known manner, a primary circuit 1 and a secondary circuit 2 which are coupled by a transformer 3. The primary circuit 1 comprises, in series with the primary winding 4 of the transformer 3, a voltage source 5, here a generator, and an MOS control transistor 6. Likewise, the secondary circuit 2 comprises, in series with the secondary winding 7 of the transformer 3, a voltage source 8, here a filtered load, and an MOS control transistor 9. A capacitor 10 is arranged in parallel with the primary winding 7, likewise in a known manner.

FIG. 1a depicts the transformer 3 modelled as a perfect transformer with solely the magnetizing inductance 11 of the transformer, of value Lm seen from the magnetizing medium. Np and Ns being the number of turns of the primary and secondary windings respectively, Ip and Is the current in these windings, the magnetizing current has the value $$ILm = NpIp + NsIs$$

The voltages across the terminals of the sources 5 and 8 will moreover be denoted Vin and Vout.

According to the invention, the primary circuit 1 furthermore comprises, in parallel with the primary winding 4, a diode 12 and an MOS transistor 13 whose operation will be described hereinbelow.

This description of the operation of the converter of FIG. 1 will be given with reference to FIGS. 2-1 to 2-6. The MOS transistors will, in these figures, be modelled by their capacitors and spurious diodes during the opening phases, and as short circuits during their closure phases. The spurious diodes will themselves be regarded as ideal, that is to say as short circuits when they conduct, and as open circuits when they are disabled. Finally, the diode 12 is modelled as a capacitance in parallel with an ideal diode.

The first operating phase (FIG. 2-1), of duration Ton, is that of the storing of energy in the transformer 3 from the source 5. The primary MOS 6 is closed when the voltage at its terminals vanishes at the end of the previous phase, thus allowing smooth switching. The MOSs 9 and 13 are open and the diode 12 conducts.

In the course of this first phase, the magnetizing current varies from Ion1m, negative, to Ion2m, positive. The voltage across the terminals of the magnetizing inductance remains constant at the value Vin/Np (FIG. 4). The spurious diode of the MOS 6 conducts as long as the current Ip in the primary circuit is negative. The detection of a set-point value Ion2p causes the opening of the MOS 6, which starts phase 2, represented in FIG. 2-2.

During this second phase, of duration Tr, all the MOSs are open. The opening of the MOS 6 causes a resonance between the primary inductance Lp and the capacitor Ceqp equivalent to all the capacitors of the circuit taken back to the primary.

In the course of this phase, the energy is constant, and hence $$ILm^2 * Zeqm + VLm^2 = \text{Constant}$$

and the operating point of the converter describes an arc of a circle in FIG. 4. The detection of the 0 v crossing of the voltage Vs across the terminals of the secondary winding causes the closure of the MOS 9 and the start of the third phase.

This phase 3 is that of the restitution to the secondary of the energy stored, during a time Toff. The MOS 6 is open and the MOS 13 is closed (the diode 12 is reverse-biased, so that the current in the MOS 13 is zero).

Figure 3:
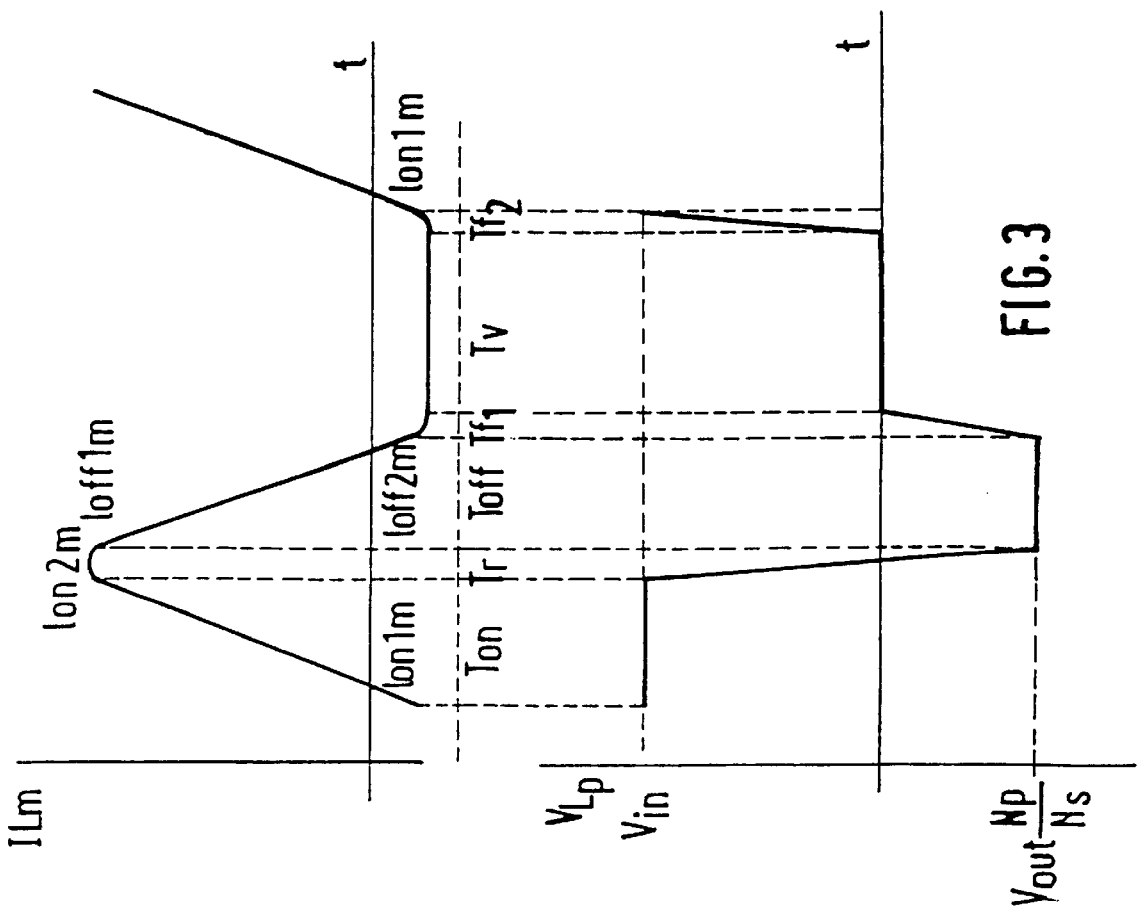

During this phase, the voltage VLm across the terminals of the magnetizing inductance is constant at the value −Vout/Ns (FIG. 4), and the current ILm decreases from Ioff1m to Ioff2m (FIG. 3). The detection of a set-point value at Ioff2s causes the opening of the MOS 9 and the start of phase 4.

The opening of the MOS 9 brings about a resonance. The current ILs continues to flow and charges the capacitance Cs of the circuit seen from the secondary. The MOS 6 is open and the MOS 13 closed.

In the course of this phase, the point of the diagram of FIG. 4 describes an arc of a circle as in the course of phase 2, and the voltage VLs increases in tandem with the charging of the capacitor by the current ILs, until the diode 12 is turned on, thus interrupting the resonance and starting the fifth phase after a time Tf1 (FIG. 5).

In the course of this idle phase, the two MOSs 6 and 9 are open, and the MOS 13 closed. The diode 12 is on, imposing a zero voltage across the terminals of the primary winding 4. Thus, the transformer 3 keeps a constant energy in the course of this phase, which is therefore neutral from the energy point of view.

The current ILm in the magnetizing inductance is constant, and the voltage across its terminals is zero. The operating point on the diagram of FIG. 4 is fixed, on the vertical intensity axis. It will be observed that this idle phase could have been triggered at the other zero voltage point of the diagram, but the short-circuit current would have been higher.

The duration Tv of this idle phase is adjusted so that $$T = Ton + Tr + Toff + Tf1 + Tv + Tf2$$

is constant and equal to the cutoff period, Tf2 being the duration of the sixth phase which will be described hereinbelow. It is this idle phase which makes it possible to operate at constant frequency.

When the duration Tv is reached, the MOS 13 is opened, by means not represented which are capable of calculating this duration, and the resonance phase resumes. All the MOSs are open. The operating point on the diagram of FIG. 4 follows the arc of a circle of phase 4.

The detection of the 0 crossing of the voltage of the MOS 6 causes the start of phase 1 of a new cycle.

It will be observed here that the closure of the MOS 13 is commanded by any suitable means at the same time as that of the MOS 9. This involves a simple practical arrangement, it being possible for this closure to be commanded at any instant in phases 3 and 4.

FIGS. 5 and 6 illustrate two other embodiments, the manner of operation of which is equivalent to that of FIG. 1.

In FIG. 5, the MOS 15 for controlling the duration of the cycle and its diode 16 in series are connected in parallel with the winding 7 of the secondary of the transformer, so as to short-circuit it during the idle phase.

In FIG. 6, the transformer comprises a third winding 17. The MOS transistor 18 for controlling the duration of the cycle and its diode 19 are here connected to this winding so as to short-circuit it during the idle phase.

Numerous modifications and variations of the present invention are possible in light of the above teachings. It is therefore to be understood that within the scope of the appended claims, the invention may be practiced otherwise than as specifically described herein.

What is claimed is:

1. A DC/DC voltage converter, comprising:
    an inductive storage element;
    a primary controlled switch between a primary source and said inductive storage element; and
    a secondary controlled switch between said inductive storage element and a secondary source;
    wherein said DC/DC voltage converter is configured to operate according to a cycle for transferring energy between a primary source and a secondary source,
    said cycle includes a phase of accumulation of magnetic energy in said inductive storage element from said primary source and a phase of restitution of the accumulated magnetic energy in said secondary source,
    said DC/DC voltage converter is configured to include an energetically neutral phase in said cycle during which said inductive storage element retains energy therein, said primary and secondary controlled switches are opened, and a zero voltage is maintained across terminals of said inductive storage element, and
    said DC/DC voltage converter is configured such that said energetically neutral phase has a duration within the energy transfer cycle such that said DC/DC voltage converter operates at a predetermined frequency.

2. The converter of claim 1, further comprising configuring said DC/DC voltage converter such that said predetermined frequency is an operating frequency at minimum voltage and maximum load.

3. The converter of claim 1, wherein said DC/DC voltage converter is configured such that said energetically neutral phase is started at a zero crossing of a voltage across said terminals of a magnetizing inductance of said inductive storage element.

4. The converter of claim 3, wherein said DC/DC voltage converter is configured such that said energetically neutral phase is started while a current passing through said magnetizing inductance is at substantially a lowest value.

5. The converter of claim 1, wherein said DC/DC voltage converter is configured to short-circuit said inductive storage element to provide said energetically neutral phase.

6. The converter of claim 5, wherein said DC/DC voltage converter is configured to short-circuit said inductive storage element to provide said energetically neutral phase by short-circuiting a primary winding of said inductive storage element via a MOS transistor arranged in series with a diode, and said DC/DC voltage converter is configured to close said transistor while said diode is reverse-biased.

7. The converter of claim 5, wherein said DC/DC voltage converter is configured to short-circuit said inductive storage element to provide said energetically neutral phase by short-circuiting a secondary winding of said inductive storage element via a MOS transistor arranged in series with a diode, and said DC/DC voltage converter is configured to close said transistor while said diode is reverse-biased.

8. The converter of claim 5, wherein said DC/DC voltage converter is configured to short-circuit said inductive storage element to provide said energetically neutral phase by short-circuiting an auxiliary winding of said inductive storage element via a MOS transistor arranged in series with a diode, and said DC/DC voltage converter is configured to close said transistor while said diode is reverse-biased.

9. A process for controlling a DC/DC voltage converter having an inductive storage element, comprising the steps of:

operating said DC/DC voltage converter according to a cycle for transferring energy between a primary source and a secondary source;

configuring said cycle to include a phase of accumulation of magnetic energy in said inductive storage element from said primary source and a phase of restitution of the accumulated magnetic energy in said secondary source;

interposing a primary controlled switch between said primary source and said inductive storage element;

interposing a secondary controlled switch between said inductive storage element and said secondary source;

providing an energetically neutral phase in said cycle during which said inductive storage element retains energy therein, said primary and secondary controlled switches are opened, and a zero voltage is maintained across terminals of said inductive storage element; and configuring said energetically neutral phase to have a duration within the energy transfer cycle such that said DC/DC voltage converter operates at a predetermined frequency.

10. The process of claim 9, wherein said step of providing said energetically neutral phase comprises starting said energetically neutral phase at a zero crossing of a voltage across said terminals of a magnetizing inductance of said inductive storage element.

11. The process of claim 10, wherein said step of starting said energetically neutral phase comprises starting said energetically neutral phase while a current passing through said magnetizing inductance is at substantially a lowest value.

12. The process of claim 9, further comprising configuring said predetermined frequency as an operating frequency at minimum voltage and maximum load.

13. The process of claim 9, wherein said step of providing said energetically neutral phase comprises short-circuiting said inductive storage element.

14. The process of claim 13, wherein said step of short-circuiting said inductive storage element, comprises:

short-circuiting an auxiliary winding of said inductive storage element via a MOS transistor arranged in series with a diode; and closing said transistor while said diode is reverse-biased.

15. The process of claim 13, wherein said step of short-circuiting said inductive storage element, comprises:

short-circuiting a secondary winding of said inductive storage element via a MOS transistor arranged in series with a diode; and closing said transistor while said diode is reverse-biased.

16. The process of claim 13, wherein said step of short-circuiting said inductive storage element, comprises:

short-circuiting a primary winding of said inductive storage element via a MOS transistor arranged in series with a diode; and closing said transistor while said diode is reverse-biased.

* * * * *